Oct. 5, 1954           F. J. WALLACE           2,690,744
SELF-CONTAINED ILLUMINABLE EXAMINING INSTRUMENT
Filed Aug. 2, 1952           3 Sheets-Sheet 1
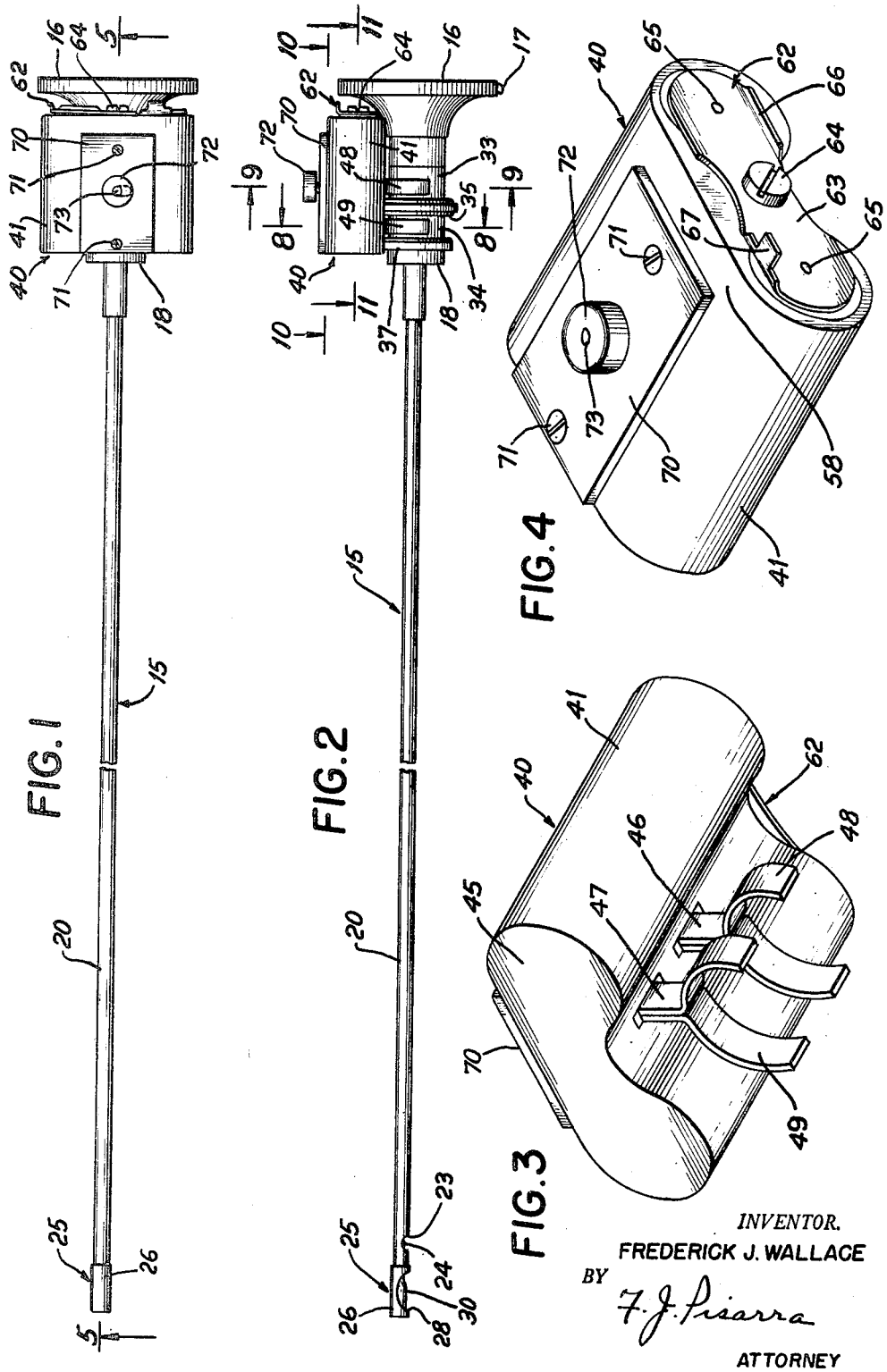
INVENTOR.
FREDERICK J. WALLACE
BY
*F. J. Pisarra*
ATTORNEY Oct. 5, 1954 F. J. WALLACE 2,690,744
SELF-CONTAINED ILLUMINABLE EXAMINING INSTRUMENT
Filed Aug. 2, 1952 3 Sheets-Sheet 2

INVENTOR.
FREDERICK J. WALLACE
BY
ATTORNEY

Oct. 5, 1954  F. J. WALLACE  2,690,744
SELF-CONTAINED ILLUMINABLE EXAMINING INSTRUMENT
Filed Aug. 2, 1952  3 Sheets-Sheet 3

*INVENTOR.*
FREDERICK J. WALLACE
BY

*ATTORNEY*

Patented Oct. 5, 1954

2,690,744

UNITED STATES PATENT OFFICE 2,690,744

SELF-CONTAINED ILLUMINABLE EXAMINING INSTRUMENT

Frederick J. Wallace, New York, N. Y., assignor to American Cystoscope Makers, Inc., New York, N. Y., a corporation of New York Application August 2, 1952, Serial No. 302,311

6 Claims. (Cl. 128—6)

This invention relates to an examining instrument, and more particularly to a self-contained illuminable examining instrument that is adapted to be inserted in internal cavities or passages, in various bodies or articles, for the purpose of permitting ready examination of the walls of such cavities or passages under conditions of illuminated vision.

Instruments constructed in accordance with this invention may be advantageously employed alone, or as part of an endoscopic instrument, for the examination of various internal body cavities. Also, such instruments may be employed to examine passages or the like in a variety of articles such as the bores of engine cylinders, for the purpose of detecting flaws or other imperfections that may be present.

It has heretofore generally been the practice to inspect internal cavities and passages by means of a small diameter telescope having at its distal end, an objective lens and a miniature electric lamp to supply illumination. Such a telescope is usually provided at its proximal end with a contact terminal that is electrically connected to the lamp. The contact terminal is, in turn, connected to a source of electric energy supply, that is remote from the telescope, by means of conductor wires. Interposed between the instrument and the source of supply is a transformer for converting the voltage of the supply to that of the lamp.

In the case of endoscopic instruments, the conductor wires are usually known as "light conducting cords." For cystoscopic or other endoscopic procedures, the light conducting cord, which is connected to the contact terminal, frequently becomes entangled, in use, with the water outlets of the instrument, particularly when the instrument is rotated. This results in inconvenience and, further interferes with the proper examination of the patient.

In instances where there is no ready source of electrical energy present, it has been necessary up to this time to have large battery boxes to supply necessary energy. Such battery boxes have heretofore been connected to the instrument contact terminal by light conducting cords of the type mentioned earlier herein. In addition to the cord becoming tangled and causing inconvenience to the user of the instrument, present day equipment is not readily portable, thereby resulting in further inconvenience.

The present invention obviates the foregoing difficulties in that it provides a completely self-contained illuminable examining instrument, thereby eliminating the need for wire conducting cords or separate sources of electrical energy. Further, this instrument possesses a number of advantages which will be readily apparent to persons skilled in the art from the detailed description set forth further along herein.

A primary object of the invention is to provide a self-contained illuminable instrument for examining internal cavities or passages under conditions of illuminated vision.

Another object of the invention is to provide a self-contained illuminable examining instrument in which a source of electrical energy, for energizing a lamp that supplies illumination, is carried by and constitutes a part of the instrument. This source of electrical energy may be readily mounted on or removed from the remainder of the instrument, as desired, and, when mounted on the instrument, does not in any way interfere with the handling or operation thereof.

The invention has for a further object the provision of an instrument of the character indicated that may be conveniently held in one hand and that has its parts, including a switch for controlling energization of the lamp, so arranged as to permit manipulation of the switch by a finger of the same hand, thereby leaving the user's other hand free for other purposes.

A still further object of the invention is to provide an examining instrument that is unitary, light-weight, compact and portable; that is reasonable in manufacturing and maintenance costs; and that is capable of performing its intended functions in an entirely satisfactory manner.

To the end that the foregoing objects may be attained, an instrument constructed in accordance with this invention preferably comprises a telescope that is adapted to be inserted in and permit examination of a cavity or a passage. The telescope includes a hollow stem which is made up of coaxial inner and outer tubular members, the inner tubular member being grooved longitudinally. The telescope also includes an objective lens at one end of the stem, an eye piece at the other end of the stem and an electric lamp secured to the stem adjacent the objective lens. The telescope is provided with a support adjacent the eye piece. A pair of electric contact rings is carried by the support and so arranged that one of the rings is electrically connected to the lamp by one of the tubular members and the other contact ring is electrically connected to the lamp by means of a conductor wire which is positioned in the groove but insulated from the tubular members.

The lamp is energized by an electrical energy supply unit that is mounted on the support and is connected to the contact rings. This unit preferably consists of a casing containing one or more small electric batteries. A switch is mounted on the casing and is adapted to control the energization of the lamp by the batteries. As will be apparent from the detailed description that follows, the parts are so arranged that the instrument may be held and operated by one hand, the switch being under control of a finger of the same hand, whereby the other hand is free for other uses.

The enumerated objects, as well as other objects, together with the advantages attainable by the practice of this invention, will be readily apparent to persons versed in the art by reference to the following detailed description, taken in conjunction with the annexed drawings that respectively describe and illustrate an arrangement of devices illustrative of a preferred embodiment of the invention.

In the drawings:

Figure 1 is a top plan view of an examining instrument constructed in accordance with this invention;

Figure 2 is a view in side elevation of the instrument shown in Figure 1;

Figure 3 is an enlarged perspective view of the unit energizing the lamp, as seen from a position below and to the left of Figure 1.

Figure 4 is a view similar to Figure 3 and illustrates the unit as seen from above and to the right of Figure 2;

Figure 5:
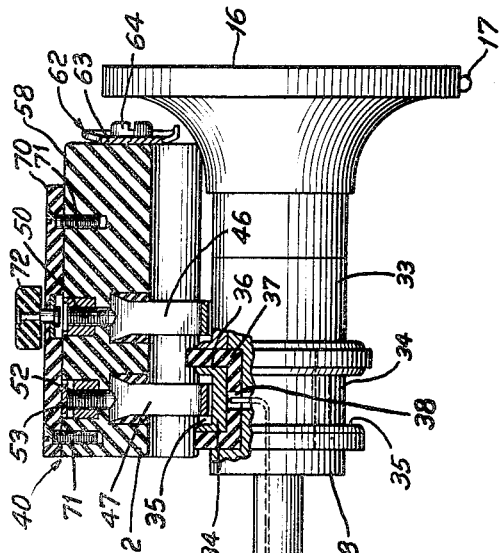
Figure 5 is a view in enlargement corresponding to Figure 2, certain parts being shown in central longitudinal cross-section.
Figure 7:
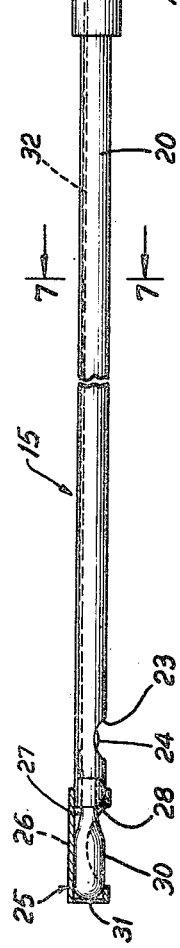
Figure 7 is a view in enlargement taken along line 7—7 of Figure 5.

Referring now to the drawings wherein like reference numerals denote corresponding parts throughout the several views, and more particularly to Figures 1, 2 and 5, the illustrated form of the invention includes an examining telescope, generally indicated by numeral 15. The telescope includes an eye piece 16, having an indicating button 17, a hollow support or supporting members 18, and a telescope stem that consists of an outer tubular member 20 and an inner tubular member 21. The inner tubular member has a longitudinal groove 22 formed therein, as best shown in Figure 7. The telescope stem is provided with a lateral fenestra 23 adjacent its forward extremity. The telescope is equipped with a suitable lens system, including an objective lens 24 that is located at fenestra 23 and is adapted to command a field of vision at right angles to the axis of the tubular members. In lieu of commanding a right angle field of vision, the lens system may be so constructed and arranged that its objective lens is adapted to command a direct or forward field of vision, a forwardly oblique of vision, or a retrospective field of vision. Telescopes adapted to command such fields of vision are well known to the art. For example, a lens system for commanding a forwardly oblique field of vision is disclosed in R. H. Wappler et al. Patent 1,680,491, dated August 14, 1928.

Figure 6:
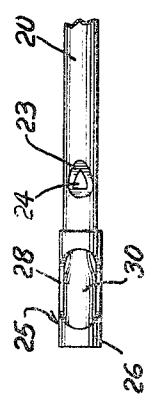
Figure 6 is a bottom plan view of the distal end portion of the instrument.

A lamp unit 25 (Figures 5 and 6) is secured to and projects forwardly of the telescope stem. This unit includes a relatively short tubular member 26 that defines a chamber 27 and a lateral fenestra 28. A lamp 30 is positioned in chamber 27 and is retained therein by a mass 31 of a suitable cement or the like. As will be noted from an examination of Figure 5, fenestras 28 and 23 are aligned with indicator button 17. Thus the user of the instrument by observing the position of the button, may readily determine the angular position of the objective lens. Lamp 30 is in series electrical connection with the telescope stem and an insulated wire conductor 32 that lies along groove 22 (Figure 7).

Mounted on support 18 is a pair of contact rings 33 and 34 that are coaxial with the telescope stem and are spaced from each other. Ring 33 is connected electrically to the telescope stem through the medium of support 18. Ring 34 has an outer annular recess 35, and, as best shown in Figure 5, is insulated from support 18. In this connection ring 34 registers with a peripheral recess 36 formed in an insulating ring 37, carried by the support and having an opening 38. Wire conductor 32 extends through opening 38 and is connected to contact ring 34.

Figure 9:
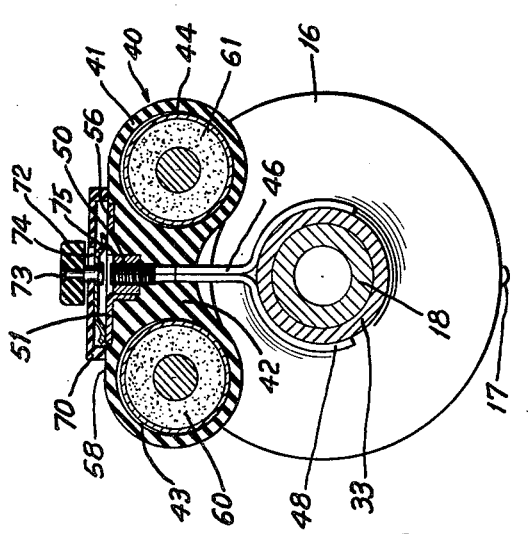
Figure 9 is a view in enlargement taken along line 9—9 of Figure 2.

Mounted on telescope 15 and forming a part of the instrument, is a unit 40 for energizing lamp 30. This unit is best shown in Figures 3 through 5 and 8 through 11 to which reference is now had. Unit 40 comprises a casing or support 41 made of a suitable insulating material, such as an appropriate synthetic plastic composition. A partition 42 divides the interior of the casing into a pair of compartments 43 and 44 (Figures 3 and 9). The casing is closed at one end as indicated by numeral 45 (Figure 3). Embedded in and extending outwardly beyond partition 42 is a pair of spaced contact members 46 and 47 having corresponding resilient saddles 48 and 49 that respectively engage and make intimate contact with rings 33 and 34. The saddles by virtue of their resiliency permit the casing to be readily snapped on or off the telescope, as desired. Further, the saddles are so configured as to permit of relative rotation between the telescope and unit 40.

Figure 8:
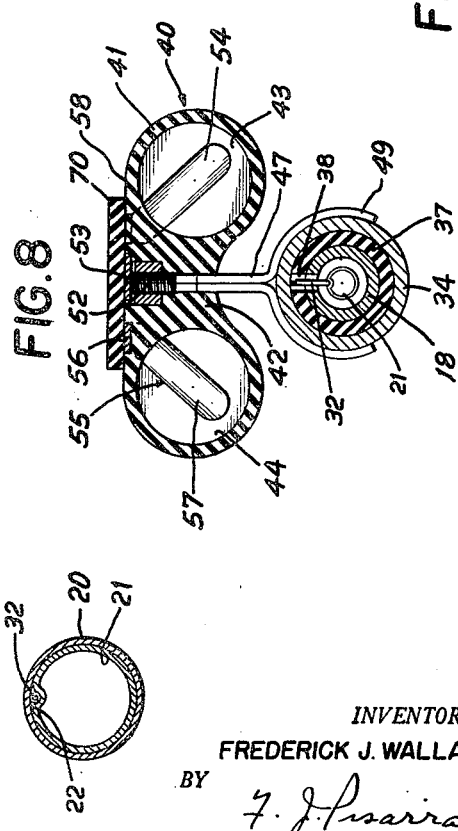
Figure 8 is a view in enlargement taken along line 8—8 of Figure 2.
Figure 10:
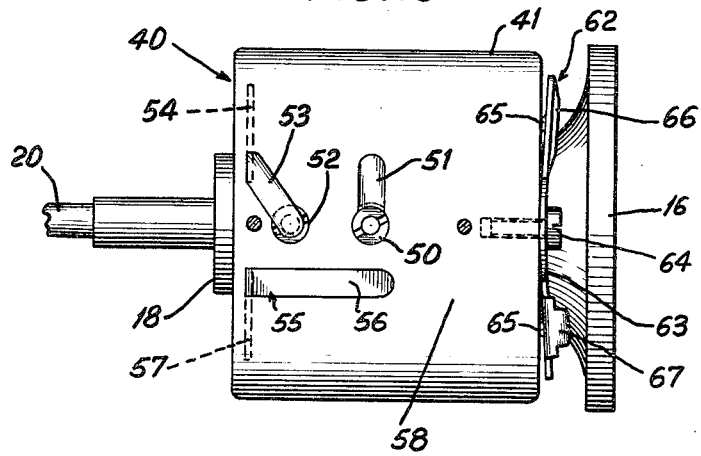
Figure 10 is a view in enlargement taken along line 10—10 of Figure 2.

A screw 50 connects the embedded end of contact member 46 with a resilient conductor strip 51 (Figures 9 and 10). Similarly, a screw 52 connects the embedded end of contact member 47 with a conductor strip 53 (Figures 8 and 10). Strip 53 extends from screw 52 through a wall of casing 41 and terminates in an end portion 54 that is positioned in compartment 43 adjacent closed end 45 of the casing. Another conductor strip 55 has a first end portion 56, that is located adjacent screw 50 and strip 51, and a second end portion 57 that is positioned in compartment 44. As is illustrated in Figure 10, conductor strip 53, and part 56 of conductor strip 55 are located along the top 58 of casing 41.

Figure 11:
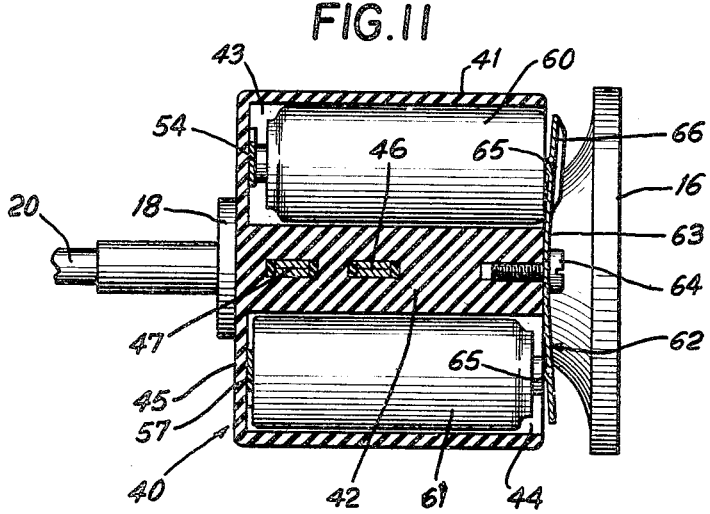
Figure 11 is a view in enlargement taken along line 11—11 of Figure 2.

A miniature battery 60 is housed in compartment 43 and contacts conductor strip portion 54. A like battery 61 is contained in compartment 44 and contacts conductor strip part 57 (Figure 11). Batteries 60 and 61 are preferably of a conventional high capacity type of suitable voltage to energize lamp 30. The batteries are series connected by a combined closure and contact device 62 (Figures 4, 10 and 11). Device 62 comprises a spring element 63 that is pivotally connected to the casing partition by a screw 64. The spring element has a pair of teats 65 that contact the batteries. Further, the spring element is provided with a camming extension 66 and an actuating flange 67 to facilitate turning the same about screw 64 in loading or unloading the casing.

A switch plate 70 overlies the conductor elements at the top 58 of the casing and is affixed to the casing by a pair of screws 71. The switch plate carries a switch that comprises a switch button 72 which is connected to the outer end of a stem 73 that is slideable along a slot 74 formed in the plate (Figure 9). A contact 75 is secured to the inner end of stem 73. Contact 75 is resilient and its left end, as viewed in Figure 9, is at all times in contact with conductor strip 51. With the parts in the relative position shown in Figure 9, the other end of contact 75 is out of engagement with contact strip portion 56, thereby opening the circuit to the lamp. Upon moving button 72 toward the right, as viewed in Figure 9, contact 75 engages conductor strip portion 56, thereby completing the circuit to the lamp.

For the purpose of briefly outlining the operation of the illustrated embodiment of the invention, it is assumed that the instrument has been assembled and the parts are in the relative positions shown in Figures 1, 2 and 9. Thus saddles 48 and 49 engage contact rings 33 and 34, respectively, and unit 40 is removably mounted on telescope 15. Incorporated in the instrument is the electric circuit referred to earlier herein and including the following elements, in the order named: switch contact 75, conductor strip 51, screw 50, member 46, saddle 48, contact ring 33, tubular member 20, lamp 30, wire conductor 32, contact ring 34, saddle 49, member 47, screw 52, conductor strip 53, battery 60 that contacts end portion 54 of strip 53, combined closure and contact device 62, battery 61 and end portion 57 of conductor strip 55. The switch is shown in open position in Figure 9. The switch is adapted to be closed by moving button 72 toward the right (Figure 9) as allowed by slot 74, thereby placing contact 75 in engagement with end portion 56 of conductor strip 55 and completing circuit to the end.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

1. In an examining instrument, a telescope adapted to be inserted in and permit examination of a cavity, said telescope including a hollow stem, an objective lens proximate one end of the stem, an eye piece at the other end of the stem, an electric lamp carried by the stem adjacent the objective lens, a supporting member secured to the stem adjacent the eye piece and a pair of contact elements carried by the supporting member in series electric connection with the lamp, said contact elements encircling the telescope, a support adapted to hold a portable source of electrical energy for energizing the lamp, a pair of electrically conductive contact members affixed to and projecting outwardly from the support, said contact members removably engaging corresponding contact elements, means joining the support and the telescope such that the support can be rotated about the telescope while the contact members are in engagement with the contact elements, and a switch on the support for completing an electric circuit including the source of electrical energy, the contact members, the contact elements and the lamp.

2. In an examining instrument, a telescope adapted to be inserted in and permit examination of a cavity, said telescope comprising a hollow stem including coaxial inner and outer tubular members, an objective lens proximate one end of the stem, an eye piece at the other end of the stem, an electric lamp carried by the stem adjacent the objective lens, a supporting member secured to the stem adjacent the eye piece, a pair of electric contact rings carried by the supporting member, said rings being coaxial with the stem and insulated from each other, one of the tubular members connecting one of the contact rings to the lamp, and an electric conductor insulated from the tubular members and connecting the lamp to the other contact ring, a support adapted to hold a self-contained source of electrical energy for energizing the lamp, a pair of resilient electrically conductive saddle members connected to and projecting outwardly from the support, each saddle member removably engaging a corresponding contact ring, said saddle members and contact rings being so constructed and arranged as to permit movement of the support about the axis of the stem.

3. In an examining instrument, a telescope adapted to be inserted in and permit examination of a cavity, said telescope comprising a hollow stem including coaxial inner and outer tubular members, an objective lens proximate one end of the stem, an eye piece at the other end of the stem, an electric lamp carried by the stem adjacent the objective lens, a supporting member secured to the stem adjacent the eye piece, a pair of electric contact rings carried by the supporting member, said rings being coaxial with the stem and insulated from each other, one of the tubular members connecting one of the contact rings to the lamp, and an electric conductor insulated from the tubular members and connecting the lamp to the other contact ring, a support adapted to hold a self-contained source of electrical energy for energizing the lamp, a pair of resilient electrically conductive saddle members connected to and projecting outwardly from the support, each saddle member removably engaging a corresponding contact ring, said saddle members and contact rings being so constructed and arranged as to permit movement of the support about the axis of the stem, a switch on the support for completing an electric circuit including the source of electrical energy, the saddle members, the contact rings and the lamp.

4. In an examining instrument, a telescope adapted to be inserted in and permit examination of a cavity, said telescope including a hollow stem, an objective lens proximate one end of the stem, an eye piece at the other end of the stem, an electric lamp carried by the stem adjacent the objective lens, a support secured to the stem adjacent the eye piece and a pair of contact elements carried by the support in series electric connection with the lamp, a unit mounted on the support, said unit comprising a casing adapted to contain a self-contained source of electrical energy for energizing the lamp, a pair of electrically conductive contact members secured to and projecting beyond one side of the casing, said contact members removably engaging corresponding contact elements and being so constructed and arranged as to permit movement of the casing about the axis of the stem, a switch mounted on a side of the casing remote from the contact members for completing an electric circuit including the source of electrical energy, the contact members, the contact elements and the lamp.

5. An instrument in accordance with claim 4 wherein the pair of contact elements comprises a pair of rings that are coaxial with the stem and insulated from each other, the pair of contact members comprises a pair of resilient saddle members, and the unit is closed at one end and includes a closure device at its other end, said device being pivotally connected to the casing.

6. In an instrument of the character described, a telescope adapted to be inserted in and permit examination of a cavity, said telescope including a hollow stem, an objective lens proximate one end of the stem, an eye piece at the other end of the stem, an electric lamp carried by the stem adjacent the objective lens, a support secured to the stem adjacent the eye piece and a pair of electric contact elements carried by the support in series electric connection with the lamp, said contact elements encircling the telescope, a unit mounted on the support, said unit comprising a hollow casing, a partition dividing the interior of the casing into a pair of compartments, each compartment being adapted to contain a storage battery, a pair of electrically conductive contact members secured to the partition and projecting beyond one side of the casing, said contact members removably engaging corresponding contact elements, means joining the casing and the telescope such that the casing can be rotated about the telescope while the contact members are in engagement with the contact elements, and a switch mounted on a side of the casing remote from the contact members for completing an electric circuit including the batteries, the contact members, the contact elements and the lamp.

References Cited in the file of this patent

UNITED STATES PATENTS

| Number | Name | Date |
| --- | --- | --- |
| 1,045,800 | Lewis | Nov. 26, 1912 |
| 1,556,355 | Roney | Oct. 6, 1925 |
| 1,971,024 | Wappler | Aug. 21, 1935 |